W. E. MILLER.
STENCH TRAP.
APPLICATION FILED JAN. 6, 1913.
1,065,706.
Patented June 24, 1913.
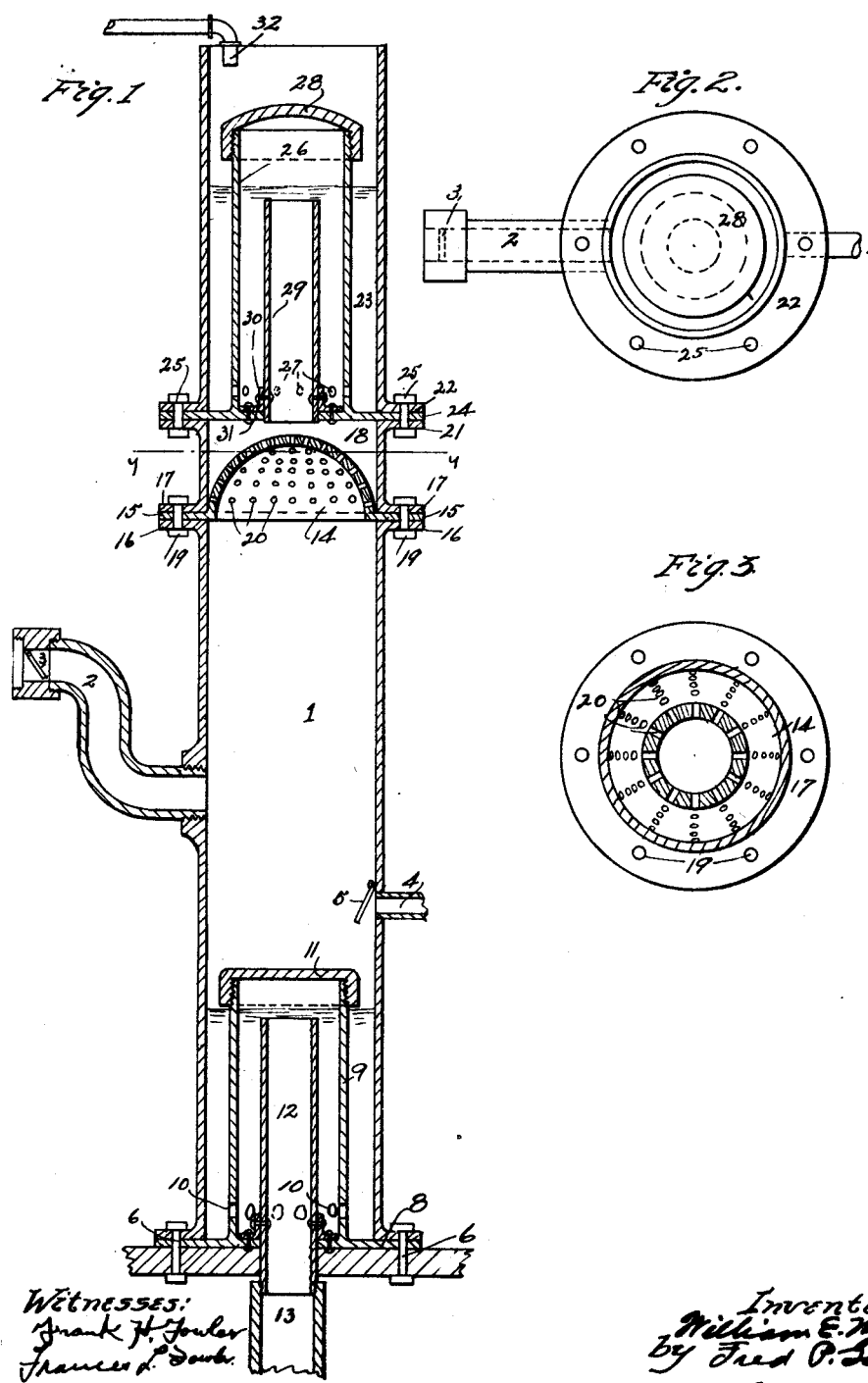

UNITED STATES PATENT OFFICE.

WILLIAM E. MILLER, OF SEATTLE, WASHINGTON.

STENCH-TRAP.

1,065,706.

Specification of Letters Patent. Patented June 24, 1913.

Application filed January 6, 1913. Serial No. 740,296.

*To all whom it may concern:*

Be it known that I, WILLIAM E. MILLER, a citizen of the United States, and a resident of Seattle, county of King, and State of Washington, have invented certain new and useful Improvements in Stench-Traps, of which the following is a specification.

This invention relates to stench traps, and has for its principal object to provide a device of this character which is of simple and durable construction, not likely to get out of order and which, it is believed, more completely and effectually traps the stench from rendering tanks, and the like than has heretofore been known in the art.

The invention will be fully described in the following specification and shown in the accompanying drawings, in which—

Figure 1 is a vertical sectional view of my device, with fragments of the conducting pipes attached. Fig. 2 is a plan view of the same. Fig. 3 is a cross sectional view upon the line *y—y* of Fig. 1.

Referring now more particularly to the drawings, the reference numeral 1 designates a stench receiving chamber, which is preferably circular in cross section and with which communicates the pipe 2 in which is the check valve 3. The opposite end of the said pipe communicates with the rendering tank, or other stench producing source. Upon the opposite side of the chamber 1 is the pipe 4 which leads to a "drier," which is used in the meat packing industry. In such driers it is usual to employ fans which produce a constant current of air over and around the product to be dried, and considerable unpleasant odor often results from such process. This odor passes through the pipe 4 so long as the fans are in operation to create sufficient draft to keep the flap 5 open, and when there is not sufficient draft said flap drops by gravity and thus closes the mouth of the pipe 4. The lower ends of the walls of the chamber 1 are suitably secured to the floor, as by the bolts 6, a bottom plate 7 intervening between the floor and the flange 8, through which the bolts pass. Rising from the said plate is the pipe 9, near the bottom edge of which are the perforations 10. The top of the pipe 9 is closed by the screw cap 11. Within the pipe 9, and passing through the plate 8 and the floor, is a second pipe 12, the top of which is open, and to whose bottom is attached the pipe 13 which leads to a sewer. The top of the chamber 1 is partially closed by the dome 14 which has the flange 15, the said flange being secured between the similar flanges 16 and 17 upon the walls of the chamber 1 and the upper chamber 18 respectively, and are there held in position by the bolts 19. The dome 14 has the numerous perforations 20, for a purpose presently to be explained. Extending from the walls of the upper chamber 18 is the annular flange 21, between which and the similar flange 22, upon the walls of the top chamber 23, is the plate 24, secured in place by the bolts 25. Rising from the plate 24 is the tube 26, near the bottom edge of which are the perforations 27, and to the top of which is affixed the screw cap 28. Within the pipe 26, and passing through the plate 24, is the pipe 29, whose upper and lower ends are open. I secure the pipe 29 firmly to the plate 24 by means of the annular flanged collar 30 and the rivets 31. The upper end of the top chamber 23 is open and into it is directed the pipe 32, through which constantly flows a stream of fresh water.
There is a definite and fixed relation between the caliber of the pipe 32 and the apertures 27, in the pipe 26, the apertures 20 in the dome 14 and the apertures 10 in the pipe 9, to the end that the fresh water pouring in through the pipe 32 does not empty through the said apertures and perforations with sufficient rapidity to prevent the space between the walls of the pipes 23 and 29 filling with water to about the level shown.
The air above the water level within the pipe 26 tends to compress, of course, but finds its way out with some force through the bottom of the pipe 29, thence through the perforations 20, through which also, of course, passes the water which overflows from the pipe 26 into the pipe 29. The stench entering the chamber 1 through the pipes 2 and 4, or either of them, cannot find its way out in an upward direction because the outlets in the dome 14 are the only outlets in that direction and they are kept constantly closed by the downwardly flowing fresh water, as above described. The lower trap, consisting of the pipes 9 and 12 is substantially a duplication of the upper trap consisting of the pipes 26 and 29, and as the water flows downwardly through the pipe 12 and out through the pipe 13, it is followed by the offensive gases and carried into the sewer or to a sufficient distance from the source of the stench so as not to interfere with the comfort of adjacent populated districts.

I have shown a particular form or embodiment of my invention, but I am aware that many minor changes therein will readily suggest themselves to others without departing from the spirit and scope of the invention and I do not, therefore, desire to be limited to the exact form herein shown and described.

What I claim as new and desire to protect by Letters Patent is—

In a stench trapping device, the combination of a main stench receiving chamber, a numerously perforated dome therefor, an intermediate chamber into which said dome projects, a top chamber, a sub chamber within said top chamber having inlet holes, a pipe within said sub chamber and which communicates with said intermediate chamber, stench inlet pipes communicating with said main stench chamber, a sub chamber within the main chamber and a pipe within said last mentioned sub-chamber which communicates with an outlet pipe.

WILLIAM E. MILLER.

Witnesses:
FRED P. GORIN,
R. D. SMALLEY.